JOHN W. BROWN.

Improvement in Water Conductor.

No. 122,355.                        Patented Jan. 2, 1872.

Witnesses:
John Becker.
Geo. W. Mabee.

Inventor:
J. W. Brown
per
Attorneys.

UNITED STATES PATENT OFFICE.

JOHN W. BROWN, OF MILTON, VERMONT.

IMPROVEMENT IN WATER-CONDUCTORS.

Specification forming part of Letters Patent No. 122,355, dated January 2, 1872.

Specification describing a new and Improved Water-Conductor, invented by JOHN W. BROWN, of Milton, in the county of Chittenden and State of Vermont.

This invention has for its object to furnish a strong and durable conductor for water and other fluids; and it consists in a trough and water-pipe in combination with cement, arranged as hereinafter described.

Figure 1:
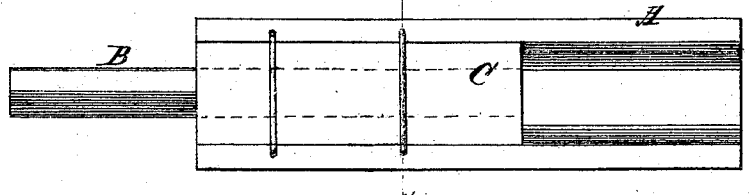
Figure 2:
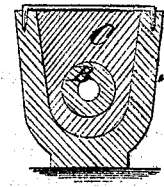
Figure 3:
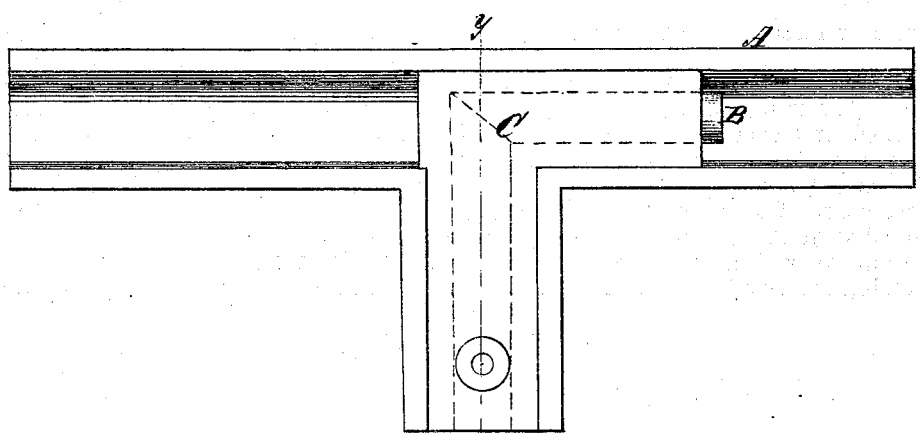
Figure 4:
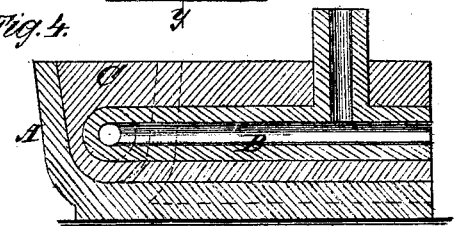

In the accompanying drawing, Figure 1 is a top view of my improved conductor, showing the combination of parts. Fig. 2 is a vertical cross-section of Fig. 1 taken on the line $x$ $x$. Fig. 3 shows the application of my invention where a branch pipe is used. Fig. 4 is a vertical section of Fig. 3 taken on the line $y$ $y$.

Similar letters of reference indicate corresponding parts.

A is the trough, B is the pipe, and C represents the cement. The trough A and pipe B are made of burned or hardened clay or cement laid in the ground, the flat bottom of the trough A resting on the bottom of the ditch, as seen in the drawing. The water-pipe B is entirely surrounded with the cement, so that the joints of the pipe as well as of the trough are covered and filled thereby. The parts being thus joined together form a solid and compact mass, capable of resisting great pressure with the joints perfectly tight. The cement, owing to the moisture in the earth, will harden to the consistency of stone, and the pipe will be protected thereby.

I do not confine myself to any particular form or size of pipe or trough, nor to any particular ingredients in their composition, nor to any particular kind of cement, but propose to use hydraulic cement.

The trough may be made to receive branch pipe of any angle, and is adapted to all situations where earthen or cement pipe can be used.

Having thus described my invention, I claim as new and desire to secure by Letters Patent—

1. The combination of the trough A, pipe B, and cement C, substantially as and for the purposes described.

2. A water-conductor, consisting of a supporting trough and a water-pipe packed therein with cement, substantially as shown and described.

JOHN W. BROWN.

Witnesses:
SAYLES NICHOLS,
E. W. PEEL.

(20)